United States Patent
Huber et al.

(10) Patent No.: US 6,777,021 B2
(45) Date of Patent: Aug. 17, 2004

(54) METHOD OF FLAVORING PROTEIN DENATURED VITAL WHEAT GLUTEN FIBER PRODUCTS AND IMPROVED FLAVORED PRODUCT

(75) Inventors: Cynthia Huber, Sanbornton, NH (US); Robert H. Rines, Concord, NH (US)

(73) Assignee: Knox Mountain Licensors, Inc.

( * ) Notice: Subject to any disclaimer, the term of this patent is extended or adjusted under 35 U.S.C. 154(b) by 324 days.

(21) Appl. No.: 10/100,159

(22) Filed: Mar. 6, 2002

(65) Prior Publication Data

US 2003/0170375 A1 Sep. 11, 2003

(51) Int. Cl.$^7$ .................................................. A23J 3/18
(52) U.S. Cl. ........................................................ 426/656
(58) Field of Search ................................. 426/656, 622, 426/652, 574, 534

(56) References Cited

U.S. PATENT DOCUMENTS

| 4,910,040 A | * | 3/1990 | Sagarino et al. ............ 426/656 |
| 5,593,717 A | * | 1/1997 | Huber et al. ................ 426/656 |
| 6,001,412 A | * | 12/1999 | Huber et al. ................ 426/656 |

* cited by examiner

Primary Examiner—Keith Hendricks
(74) Attorney, Agent, or Firm—Rines and Rines

(57) ABSTRACT

A method of providing a denatured wheat gluten fiber product with flavoring applied at a critical period of time of its cooling and shrinking after hot moisture-denaturing, that is uniformly flavored throughout and, on consumption, is absent characteristic wheat gluten after taste.

4 Claims, No Drawings

METHOD OF FLAVORING PROTEIN DENATURED VITAL WHEAT GLUTEN FIBER PRODUCTS AND IMPROVED FLAVORED PRODUCT

FIELD OF INVENTION

The present invention relates to protein-denatured wheat gluten products, being more particularly concerned with products of the type described in U.S. Pat. Nos. 5,593,717 and 6,001,412 or the like, and more specifically to the aftertaste and other problems involved in flavoring such products during their manufacture and subsequent shelf-life.

BACKGROUND

The above-mentioned patents of the applicants describe a novel technique for producing vital wheat gluten protein-denatured fiber products capable of providing a high protein, healthful, fat-free analog of meat and poultry and the like. These products may be so manufactured that they closely simulate the mouth feel, taste sensation, appearance and, where desired, taste of actual meat products and the like, though providing a much more healthful, fat-free product which can, for example, also include all the amino acids and protein contained in meat itself, but with none of the deleterious effects of fat, uretic and other acids or the like.

Very successful products of this nature have been produced and taste-tested for those who do not eat meat products and for meat eaters who desire a healthy substitute without compromising taste and recipes.

These novel protein-denatured layered fiber wheat gluten products are neutral in taste unless flavored or spiced. The addition of flavoring and spices and the like furthermore makes these products extremely versatile and adaptable to satisfy the different culture tastes around the world, serving as a new basic food susceptible of a myriad of flavorings acceptable to various cultures and tastes, but with the familiar structure of basic meat, poultry and related animal products.

In said patents, moreover, the importance of the proper use of a nutritional yeast added to the dry mixture of pulverized dehydrated vital wheat gluten powder admixed with whole grain wheat flour is described, with the limitation that this additive must be used prior to subsequent hydration of the fiber strands created by the particularizing and shredding of the hydrated mixture before being subjected to hot moisturizing cooking. The cooking is continued to the stage of gluten fiber denaturization (normally about 20 minutes) before the final cooling by evaporation into the final product form.

The purpose of the nutritional yeast was to generate a leavening generation of gas bubbles for creating expansion during the hydration step, and for some aeration-texturing which was discovered to result in the leavening of the product.

It is also disclosed that a desirable flavor permeation results in the use of the nutritional yeast. Additional flavors and spices that are desired in the product are described as also addable, but without any specifics as to when and where these flavors are introduced in the manufacturing process. In fact, highly acceptable products have been produced at all stages; in the dry mix, in the moisturizing and denaturing bath, topically on the finished product, and otherwise.

Copious taste-testing of various forms of this product ranging from product resembling ground beef to simulated chicken slices, meat loaf, burgers and the like, and also simulated ham slices, have indicated, in some cases, that some products have a residual post-consumption remaining aftertaste in the mouth, somewhat slightly bitter. Such aftertaste has been found sometimes to occur even though a "burger" has been consumed with condiments, buns, cheese, etc. Many do not object to the aftertaste but it has been found that there are some apparently more sensitive individuals who would prefer more exacting residual flavor sensations.

This invention is directed to the discovery of how to avoid substantially all aftertaste sensation irrespective of what flavors or spices are used and irrespective of whether the product is in ground of cohesive or other form.

Indeed, the discovery of the critical location, timing and application of flavor and spice or the like, all hereinafter sometimes generically referred to as flavorings and flavors, has been found to be generically applicable across-the-board for all different types of these products and for all known flavorings.

OBJECTS OF INVENTION

The principal object of the present invention, therefore, is to provide a new and improved method of flavoring products of this nature that shall not be subject to the above-described limitations, but that admirably inherently eliminates all semblance of wheat gluten aftertaste.

A further object is to provide a novel flavored product of this type wherein the flavor distribution is more uniform throughout the product, accentuating the taste and desired flavor and, upon the consuming of the product, leaving the user only with the desired taste and sensation of the intended flavors.

Other and further objects will be explained hereinafter and are more particularly delineated in the appended claims.

SUMMARY

In summary, the invention embraces a method of flavoring heat-denatured wheat gluten fiber products that results in uniform flavoring throughout the product and without characteristic gluten aftertaste in the consuming of the product, that comprises, denaturing the wheat gluten product fibers by hydrating in a boiling both and, after removing from the bath, permitting the resulting moisture-swelled hot denatured fiber product to start to cool and shrink towards a final evaporation state; applying a solution or spray of flavoring to the surface of the swelled product at the time it has just cooled and evaporated to the degree of settling into substantially its final form, but before it has developed an exterior crust on the still-hot product; and thereafter permitting the total cooling and solidifying of the flavored product.

Preferred and best mode techniques and products are hereinafter detailed.

PREFERRED EMBODIMENT OF THE INVENTION

Since the invention deals with critical locations, timing, and modes of application of the flavoring during the process of manufacturing, it is not considered that drawings are required for the full explanation of the invention.

As previously indicated, the aftertaste sensation which some do not prefer, has been obtained with flavorings added almost immediately to the dry mix, or later to the hydrating bath, or still later to the denatured product, etc.

What has now been discovered is that the resulting aftertaste can be substantially eliminated in all cases for all
} types of flavorings and all forms of the denatured fiber products if the flavoring is added only at a critical time during the evaporating, shrinking, and cooling of the finished denatured product upon its emergence from the hydrating and denaturing boiling bath. The criticality of the flavoring cycle requires that the flavoring not be applied when the boiled product is too hot and too full of moisture, because then the flavoring itself is sloughed off in the high rate of evaporation and out-pouring of moisture. On the other extreme, the flavoring has been found not to permeate uniformly throughout the product after the product has been allowed to cool and shrink to its final evaporation state. The results of the invention occur only when the flavoring is applied in a water-based or soluble medium, as by spraying the outside surface, or by passing the product through a subsequent rapid emersion in a bath of flavoring, at about the precise time that the product has cooled and evaporated to the degree of its settling into its substantial final dimensional form—but before having formed an exterior dry coating surface. That precise time, indeed, is when the denatured product is still at a temperature well above room temperature. As an example, a four-ounce, ¼ inch "burger" patty may be formed by the method of said patents and conveyed out of a boiling denaturing bath of about 200° Fahrenheit. The product is allowed to shrink, settle, evaporate and cool until it reaches about 8–10% of its original swelled denatured size and has settled in form but has not yet developed a crust outer coating,—generally at a temperature change to about 100–110° Fahrenheit. This occurs rapidly in about eight (8) minutes of exposure to room temperature (and quicker if it is subjected to a freezing process).

It is at this critical period of time, that a spray solution of flavors is applied to the still cooling product surface and has been found then to be capable of rather rapidly absorbing the flavoring solution uniformly throughout the product cross-sectional area and volume, and further then capable of retaining and not dissipating or evaporating in the further solidifying of the cooled product.

Tests have shown that with the flavoring thus critically applied, the residual aftertaste just disappears and does not exist. This result is probably explainable by the fact that, with the product in almost final form, the applied flavoring is also at an optimum form and peak, and the product is still hot enough actively to absorb the flavoring throughout its volume. In any event, it has been found that only under these conditions is there apparently no aftertaste or sensation of the same, no matter what flavor is added, and no matter how long after the manufacture of the product it has been on the shelf or in the freezer (certainly within its shelf life of about 18 months for frozen product), and for the life of refrigerated vacuum packed product (about a month), and for at least about a week of open container storage in the refrigerator.

Another unobvious feature of this discovery resides in the fact that nutritional yeast has historically been used in other situations because it is a flavor enhancer; that is, when flavors are added concurrently with the nutritional yeast to other types of product, the yeast acts to disseminate the flavors in its expansion process. With the present discovery, however, the nutritional yeast has already performed its expansion function before the flavors are added—the selection of the critical time period, above-discussed, once the final product is formed but still not yet solidified and cooled, effecting uniform flavor dissemination by its own mechanism, not merely by the nutritional yeast function.

Still a further advantage of the invention over customary adding of the flavoring prior to cooking resides in the fact that the cooking either disrupts the efficacy of the flavoring or does not adequately mask an undesirable aftertaste.

Further modifications will also occur to those skilled in this art and such are considered to fall within the spirit and scope of the application as defined in the appended claims.

What is claimed is:

1. A method of flavoring heat-denatured wheat gluten fiber products that results in uniform flavoring throughout the product and without gluten aftertaste in the consuming of the product, that comprises denaturing the wheat gluten product fibers by hydrating in a boiling bath and, after removing from the bath, permitting the resulting moisture-swelled hot denatured fiber product to start to cool and shrink towards a final evaporation state; applying a solution or spray of flavoring to the surface of the swelled product at the time it has just cooled and evaporated to the degree of settling into substantially its final form, but before it has developed an exterior crust on the still-hot product; and thereafter permitting the total cooling and solidifying of the flavored product.

2. The method of claim 1 wherein the temperature of the bath is maintained at about 200° Fahrenheit, and the flavoring is applied when the denatured product is cooled to about 100 to 110° Fahrenheit.

3. The method of claim 1 wherein the flavoring solution or spray is water-based with the flavoring being water-soluble.

4. A denatured wheat gluten fiber product void of gluten aftertaste, prepared by the method of claim 1.

* * * * *